US012129211B2

(12) United States Patent
Dickerson et al.

(10) Patent No.: US 12,129,211 B2
(45) Date of Patent: Oct. 29, 2024

(54) EXTRUDED CERAMIC NANOFIBERS AND DERIVED MATERIALS

(71) Applicant: Government of the United States, as represented by the Secretary of the Air Force, Wright-Patterson AFB, OH (US)

(72) Inventors: Matthew B. Dickerson, Beavercreek, OH (US); John J. Bowen, Dayton, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 648 days.

(21) Appl. No.: 17/355,841

(22) Filed: Jun. 23, 2021

(65) Prior Publication Data

US 2022/0306544 A1     Sep. 29, 2022

Related U.S. Application Data

(60) Provisional application No. 63/167,501, filed on Mar. 29, 2021.

(51) Int. Cl.

| *C04B 35/571* | (2006.01) |
|---|---|
| *B28B 1/00* | (2006.01) |
| *B33Y 10/00* | (2015.01) |
| *B33Y 80/00* | (2015.01) |
| *C04B 35/622* | (2006.01) |
| *C04B 35/624* | (2006.01) |
| *C04B 35/634* | (2006.01) |
| *C04B 35/64* | (2006.01) |
| *D01F 8/18* | (2006.01) |

(52) U.S. Cl.
CPC ............ *C04B 35/571* (2013.01); *B28B 1/001* (2013.01); *B33Y 10/00* (2014.12); *B33Y 80/00* (2014.12); *C04B 35/62281* (2013.01); *C04B 35/624* (2013.01); *C04B 35/63424* (2013.01); *C04B 35/64* (2013.01); *D01F 8/18* (2013.01); *C04B 2235/483* (2013.01); *C04B 2235/5244* (2013.01); *C04B 2235/6021* (2013.01); *C04B 2235/6026* (2013.01); *C04B 2235/95* (2013.01)

(58) Field of Classification Search
CPC ............ C04B 35/624; C04B 35/63424; C04B 35/571; C04B 35/64; C04B 35/62281; C04B 2235/6026; C04B 2235/6021; C04B 2235/483; C04B 2235/95; C04B 2235/5244; B33Y 10/00; B33Y 80/00; B33Y 70/10; B28B 1/001; D01D 10/02; D01F 9/08; D01F 6/52; D01F 6/94; D01F 8/18

See application file for complete search history.

(56) References Cited

U.S. PATENT DOCUMENTS

| 4,017,820 A | 4/1977 | Ross |
| 5,229,102 A | 7/1993 | Minet et al. |
| 6,367,412 B1 | 4/2002 | Ramaswamy et al. |
| 6,730,802 B2 | 5/2004 | Shen et al. |
| 7,029,634 B2 | 4/2006 | Sherwood, Jr. |
| 7,714,092 B2 | 5/2010 | Shen |
| 8,742,008 B2 | 6/2014 | Shen et al. |
| 2003/0003127 A1 | 1/2003 | Brown et al. |
| 2004/0161596 A1 | 8/2004 | Taoka et al. |

OTHER PUBLICATIONS

Wan, J.; Alizadeh, A.; Taylor, S. T.; Malenfant, P. R. L.; Manoharan, M.; Loureiro, S. M.; Nanostructured Non-oxide Ceramics Templated via Block Copolymer Self-Assembly. Chem. Mater. 2005, 17, 5613-5617.
Shi, Y.; Wan, Y.; Zhao, D.; Chem. Soc. Rev. Chem. Soc. Rev., 2011, 40, 3854-3878.
Chan, V. Z. H.; Hoffman, J.; Lee, V. Y.; Iatrou, H.; Avgeropoulos, A.; Hadjichristidis, N.; Miller, R. D.; Thomas, E. L.; Ordered Bicontinuous Nanoporous and Nanorelief Ceramic Films from Self Assembling Polymer Precursors. Science 1999, 286 (5445), 1716-1719.
Malenfant, P. R. L.; Wan, J.; Taylor, S. T.; Manoharan, M.; Self-assembly of an organic-inorganic block copolymer for nano-ordered ceramics. Nat. Nanotechnol. 2007, DOI 10.1038/nnano.2006.168, 43-46.
Shi, Y. F.; Meng, Y.; Chen, D. H.; Cheng, S. J.; Chen, P.; Yang, H. F.; Wan, Y.; Zhao, D. Y.; Highly Ordered Mesoporous Silicon Carbide Ceramics with Large Surface Areas and High Stability. Adv. Funct. Mater. 2006, 16, 561-567.
Kamperman, M.; Fierke, M. A.; Garcia, C. B. W.; Wiesner, U.; Morphology Control in Block Copolymer/Polymer Derived Ceramic Precursor Nanocomposites. Macromolecules 2008, 41, 8745-8752.
Susca, E. M.; Beaucage, P. A.; Hanson, M. A.; Werner-Zwanziger, U.; Zwanziger, J. W.; Estroff, L. A.; Wiesner, U.; Self-Assembled Gyroidal Mesoporous Polymer-Derived High Temperature Ceramic Monoliths. Chem. Mater. 2016, 28, 2131-2137.
Taylor, S. T.; Wan, J.; Malenfant, P. R. L.; Alizadeh, A.; Manoharan, M.; Morphology and Phase Ordering In Polymer-Derived Nanoceramics. Microsc Microanal 2006, 12(Supp 2), 568-569.
Wan, J.; Malenfant, P. R. L.; Taylor, S. T.; Loureiro, S. M.; Manoharan, M.; Microstructure of block copolymer/precursor assembly for Si—C—N based nano-ordered ceramics. Mater. Sci. Eng. 2007, A 463, 78-88.
Meza, L. R.; Das, S.; Greer, J. R.; Science 2014, 345 (6202), 1322-1326.

(Continued)

*Primary Examiner* — Monica A Huson
(74) *Attorney, Agent, or Firm* — AFMCLO/JAZ; James F. McBride

(57) ABSTRACT

The present invention relates to gels and processes for making bundles of aligned ceramic nanofibers, ceramic nanostructures made by such processes, and methods of using such ceramic nanostructures. Such process is templated via block copolymer self-assembly but does not require any post processing thermal and/or solvent annealing steps. As a result, such process is significantly more efficient and scalable than other processes that are templated via block copolymer self-assembly. The resulting fibers are aligned according to the direction of deposition, making steps where individual fibers are bundled unnecessary.

11 Claims, No Drawings

(56) References Cited

OTHER PUBLICATIONS

Bauer, J.; Hengsbach, S.; Tesari, I.; Schwaiger, R.; Kraft, O.; High-strength cellular ceramic composites with 3D microarchitecture. Proc. Natl. Acad. Sci. 2014, vol. 111, No. 7, 2453-2458.

Jang, D.; Meza, L. R.; Greer, F.; Greer, J. R.; Fabrication and deformation of three-dimensional hollow ceramic nanostructures. Nat. Mater. 2013, 12, 893, 1-6.

Rueschhoff, Lisa; Baldwin, Luke; Berrigan, J. Daniel; Koerner, Hilmar; Pruyn, Timothy; Dickerson, Matthew; Patterning of Preceramic Polymers via Macromolecular Self-assembly. ACS Presentation Mar. 21, 2018.

Rueschhoff, Lisa; Baldwin, Luke; Apostolov, Zlatomir; Koerner, Hilmar; Pruyn, Timothy; Cinibulk, Michael; Dickerson, Matthew; Processing of Organized Ceramic Thin Film Nanocomposites via Macromolecular Self-Assembly. ICACC Presentation Jan. 23, 2018.

Rueschhoff, Lisa; Baldwin, Luke; Berrigan, J. Daniel; Koerner, Hilmar; Pruyn, Timothy; Dickerson, Matthew; Architected Ceramic Nanomaterials via Macromolecular Self-Assembly. MRS Presentation Nov. 30, 2017.

Ly, H. Q.; Taylor, R.; Day, R. J.; Heatley, F. Conversion of Polycarbosilane (PCS) to SiC-Based Ceramic Part I. Characterisation of PCS and Curing Products. J. Mater. Sci. 2001, 36, 4037-4043.

Ly, H. Q.; Taylor, R.; Day, R. J.; Heatley, F. Conversion of Polycarbosilane (PCS) to SiC-Based Ceramic Part II. Pyrolysis and characterisation. J. Mater. Sci. 2001, 36, 4045-4057.

Rathore, J. S.; Interrante, L. V. A Photocurable, Photoluminescent, Polycarbosilane Obtained by Acyclic Diene Metathesis (ADMET) Polymerization. Macromolecules 2009, 42 (13), 4614-4621.

Rangarajan, S.; Aswath, P. B. Role of Precursor Chemistry on Synthesis of Si—O—C and Si—O—C—N Ceramics by Polymer Pyrolysis. J. Mater. Sci. 2011, 46 (7), 2201-2211.

Whitmarsh, Chris K.; Interrante, Leonard V.; Synthesis and Structure of a Highly Branched Polycarbosllane Derived from (Chloromethyl)trichiorosilane. Organometallics. 1991, 10, 1336-1344.

Naviroj, M.; Miller, S. M.; Colombo, P.; Faber, K. T. Directionally Aligned Macroporous SiOC via Freeze Casting of Preceramic Polymers. J. Eur. Ceram. Soc. 2015, 35 (8), 2225-2232.

Colombo, P.; Mera, G; Riedel, R; Soraru', G.D.; Polymer-Derived Ceramics: 40 Years of Research and Innovation in Advanced Ceramics. J. Am. Ceram. Soc., 2010, 93 [7] 1805-1837.

Rueschhoff, L. M.; Baldwin, L. A.; Wheeler, R.; Dalton, M. J.; Koerner, H.; Berrigan, J. D.; Bedford, N. M.; Seifert, S.; Cinibulk, M. K.; Dickerson, M. B.; Fabricating Ceramic Nanostructures with Ductile-like Compression Behavior via Rapid Self-Assembly of Block Copolymer and Preceramic Polymer Blends. ACS Applied Nano Materials, 2019, 2 (1), 250-257.

Pillai, S. K. T; Kretchmer, W. P.; Denner, C; Motz, G.; Hund, M; Fery, A.; Trebbin, M.; Förster, S.; Kempe, R.; SiCN Nanofibers with a Diameter Below 100 nm Synthesized via Concerted Block Copolymer Formation, Microphase Separation, and Crosslinking. Small, 2012, 9 (7), 984-989.

Malenfant, P. R. L.; Wan, J.; Taylor, S. T.; Manoharan, M.; Self-Assembly of an Organic-Inorganic Block Copolymer for Nano-Ordered Ceramics. Nature Nanotechnology, 2007, 2, 43-46.

EXTRUDED CERAMIC NANOFIBERS AND DERIVED MATERIALS

CROSS-REFERENCE TO RELATED APPLICATION

The present application claims priority to U.S. Provisional Application Ser. No. 63/167,501 filed Mar. 29, 2021, the contents of which is hereby incorporated by reference in its entry.

RIGHTS OF THE GOVERNMENT

The invention described herein may be manufactured and used by or for the Government of the United States for all governmental purposes without the payment of any royalty.

FIELD OF THE INVENTION

The present invention relates to bundles of ceramic nanofibers and processes of making and using same.

BACKGROUND OF THE INVENTION

Nanostructured ceramic materials such as fiber bundles are generally difficult to assemble and align. As a result, such fibers are generally unaligned. This in turn reduces the overall strength of a fiber bundle and that of composites made from such fiber bundles.

Applicants discovered that when certain gels are extruded by processes such as 3D printing and then cured and pyrolyzed, fiber bundles having improved alignment are obtained. As such fiber bundles are highly aligned, their mechanical properties such as strength are improved. Such improved fiber bundles can, in turn, be used to produce composites having improved mechanical properties. In addition to their use in composites, such fiber bundles can be used as insulating material, sensor materials, semiconductor materials, heating elements, and filters.

SUMMARY OF THE INVENTION

The present invention relates to gels and processes for making aligned bundles of ceramic nanofibers. Such process is templated via block copolymer self-assembly but does not require any post processing thermal and/or solvent annealing steps. As a result, such process is significantly more efficient and scalable than other processes that are templated via block copolymer self-assembly. The resulting fibers are aligned according to the direction of deposition, making steps where individual fibers are bundled unnecessary.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

As used herein, the words "about," "approximately," or the like, when accompanying a numerical value, are to be construed as indicating a deviation as would be appreciated by one of ordinary skill in the art to operate satisfactorily for an intended purpose.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Processes of Making Bundles of Aligned Ceramic Fibers

For purposes of this specification, headings are not considered paragraphs and thus this paragraph is Paragraph 0014 of the present specification. The individual number of each paragraph above and below this paragraph can be determined by reference to this paragraph's number. In this Paragraph 0014, Applicants disclose a process of making bundles of aligned ceramic fibers, said process comprising pyrolyzing a cured extruded filament under an inert gas, preferably said inert gas is argon, said cured extruded filament being produced by extruding a gel to form an extruded filament, preferably said extrusion process is a 3D printing process, and then thermally curing said extruded filament to form a cured extruded filament, said gel comprising, based on total gel weight:

a) from about 11% to about 40%, of a block co-polymer having a weight average molecular weight of from about 53,000 Da to about 77,000 Da, said block co-polymer having Structure 1 below:

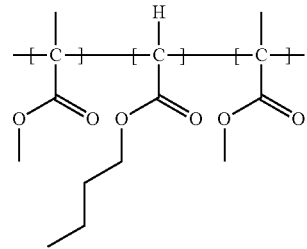

Structure 1 wherein the total weight ratio of

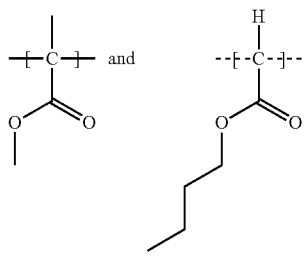

in said block co-polymer is from about 1:3 to about 3:1;
b) from about 8% to about 34% of a pre-ceramic polymer having a weight average molecular weight of from about 500 Da to about 100,000 Da, said pre-ceramic polymer comprising units having Structure 2 below:

Structure 2

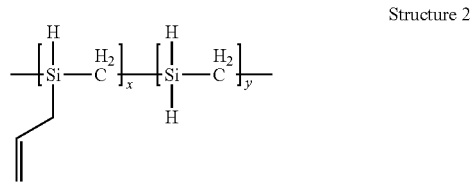

wherein the weight ratio of the moiety having indice x to the moiety having indice y is from about 10:1 to about 1:100;
c) from about 30% to about 50% of an amphilic solvent, and
d) from about 13% to about 25% of a plasticizer;
with the proviso that the combined weight percentage of said block co-polymer, pre-ceramic polymer, amphilic solvent and plasticizer does not exceed 100%.

Applicants disclose the process of Paragraph 0014 wherein, based on total gel weight, said gel comprises:
a) from about 11% to about 40% of said block copolymer, preferably from about 22% to about 37% of said block copolymer and more preferably from about 25% to about 35% of said block copolymer
b) from about 8% to about 34% of said preceramic polymer, preferably from about 15% to about 25% of said preceramic polymer and more preferably from about 19% to about 21% of said preceramic polymer
c) from about 30% to 50% about of said amphilic solvent, preferably from about 35% to 46% about of said amphilic solvent, more preferably from about 40% to 45% about of said amphilic solvent; and
d) from about 13% to about 25% of a plasticizer, preferably from about 14% to about 20% of a plasticizer and more preferably from about 16% to about 19% of a plasticizer.

Applicants disclose the process according to Paragraphs 0014 to 0015 wherein said cured extruded filament is produced by extruding a gel at a pressure of from about 500 kPa to about 4000 kPa, preferably from about from about 1000 kPa to about 3000 kPa, more preferably from about 1200 kPa to about 2000 kPa to form an extruded filament and then thermally curing said extruded filament at a temperature of about 70° C. to about 250° C., preferably at a temperature of about 100° C. to about 200° C., more preferably at a temperature of about 150° C. to about 170° C. and said cured extruded filament is pyrolyzed at a temperature of about 600° C. to about 900° C., preferably at a temperature of about 650° C. to about 850° C., more preferably at a temperature of about 775° C. to about 825° C.

Applicants disclose the process according to Paragraphs 0014 to 0016 wherein said gel comprises, based on total gel weight:
a) from about 22% to about 37% of a block co-polymer having a weight average molecular weight of from about 58,000 Da to about 72,000 Da, said block co-polymer having Structure 1 below:

Structure 1

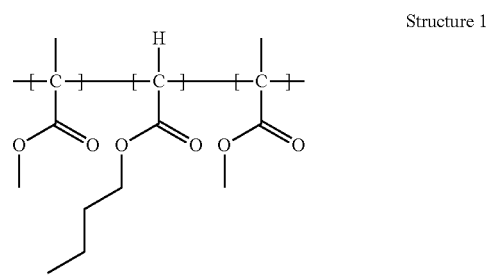 [SMILES: CCCCOC(=O)C(C(C)(C)C(=O)OC)C(C)(C)C(=O)OC]

wherein the total weight ratio of

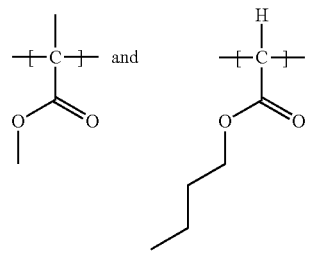

in said block co-polymer is from about 1:2 to about 2:1;
b) from about 15% to about 25% of a pre-ceramic polymer having a weight average molecular weight of from about 1,000 Da to about 25,000 Da, said pre-ceramic polymer comprising units having Structure 2 below:

Structure 2

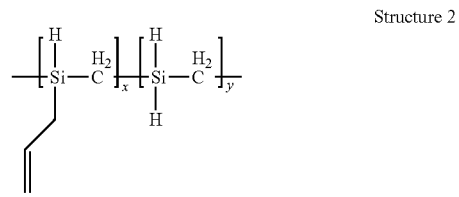

wherein the weight ratio of the moiety having indice x to the moiety having indice y is from about 1:1 to about 1:50;
c) from about 30% to about 50% of an amphilic solvent that comprises a hydroxyl moiety,
d) from about 14% to about 20% of a plasticizer;
with the proviso that the combined weight percentage of said block co-polymer, pre-ceramic polymer, amphilic solvent and plasticizer does not exceed 100%.

Applicants disclose the process according to Paragraphs 0014 to 0017 wherein said gel comprises, based on total gel weight:

a) from about 6% to about 10% of a block co-polymer having a weight average molecular weight of from about 61,000 Da to about 67,000 Da, said block co-polymer having Structure 1 below:

Structure 1

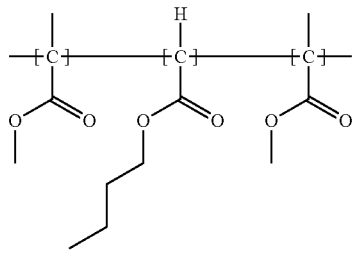

wherein the total weight ratio of

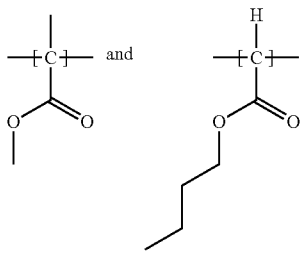 and in said block co-polymer is about 1:1;

b) from about 25% to about 35% of a pre-ceramic polymer having a weight average molecular weight of from about 2,000 Da to about 15,000 Da, said pre-ceramic polymer comprising units having Structure 2 below:

Structure 2

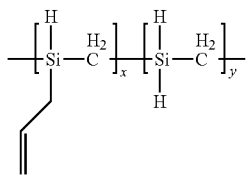

wherein the weight ratio of the moiety having indice x to the moiety having indice y is about 1:10;

c) from about 35% to about 45%, of an amphilic solvent selected from the group comprising of 2-ethylhexanol, 1-octanol, cyclohexanol and mixtures thereof, d) from about 16% to about 19% of a plasticizer;

with the proviso that the combined weight percentage of said block co-polymer, pre-ceramic polymer, amphilic solvent and plasticizer does not exceed 100%.

Applicants disclose the process according to Paragraphs 0014 to 0018 wherein said pre-ceramic polymer is linear or hyper-branched.

Applicants disclose the process according to Paragraphs 0014 to 0019 wherein said pre-ceramic is hyper-branched, said pre-ceramic polymer comprising units having the following formula:

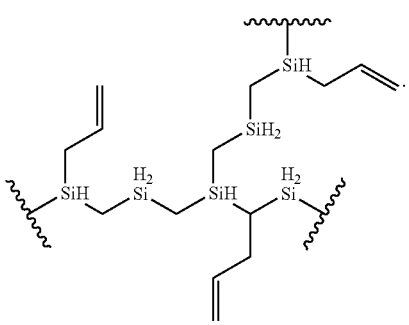

Applicants disclose the process according to Paragraphs 0014 to 0020 wherein said plasticizer comprises acetone, preferably said plasticizer is acetone. The plasticizer allows a gel to be extruded as a high viscosity liquid and then the high viscosity liquid can return to a gel state while retaining its extruded geometry and can be a continuous filament. The continuous filament is key to obtaining the continuous nanofiber that results in the beneficial properties of Applicants' fiber bundles. These nanofibers were measured to have lengths of at least 280 microns.

Suitable block co-polymers, pre-ceramic polymers, polymethylmethacrylate homopolymers, and amphilic solvents can be obtained from Kuarary America Inc. (2625 Bay Area Boulevard, Suite 600, Houston, TX) and Starfire Systems (8 Sarnowski Dr., East Glenville, NY).

Fiber Bundle Comprising Aligned Ceramic Fibers

Applicants disclose in this Paragraph 23 a fiber bundle comprising aligned ceramic fibers, said ceramic fibers having:
  a) an average fiber diameter of from about 620 nm to about 320 nm, preferably from about 550 nm to about and 330 nm, more preferably from about 360 nm to about 340 nm; and
  b) an alignment wherein at least 70% of nanofibers are within 25 degrees of the bundle's extruded direction, preferably at least 70% of nanofibers are within 10 degrees of the bundle's extruded direction, most preferably within 3 degrees of the bundle's extruded direction.

Applicants disclose a fiber bundle comprising aligned ceramic fibers according to Paragraph 0023, said ceramic fibers having an alignment wherein at least 90% of nanofibers are within 25 degrees of the bundle's extruded direction, preferably at least 70% of nanofibers are within 10 degrees of the bundle's extruded direction, most preferably within 3 degrees of the bundle's extruded direction.

Applicants disclose a fiber bundle comprising aligned ceramic fibers according to Paragraph 0024, said ceramic fibers having an alignment wherein at least 95% of nanofibers are within 25 degrees of the bundle's extruded direction, preferably at least 70% of nanofibers are within 10 degrees of the bundle's extruded direction, most preferably within 3 degrees of the bundle's extruded direction.

Methods of Using Fiber Bundles

The fiber bundles disclosed herein may be used as reinforcements for composites, specifically where fiber bundles or tows would be used and a high degree of fiber alignment would be beneficial for the strength of the structure. Such applications include aerospace or armor. The skilled artisan can use the ceramics taught in the present specification in the aforementioned applications via the teaching of the present specification. Such application teachings can be supplemented by the teachings of U.S. Pat. No. 7,056,849B2 (ceramics produced via block copolymer templating), U.S. Pat. No. 7,897,248B2 (oriented nanofibers embedded in a polymer matrix), and U.S. Pat. No. 7,749,425B2 (nanoscale ceramic composites via block copolymer templating).

Test Methods

Process for measuring diameters: The average diameter of nanofibers is found in the following way: FIJI is used to examine an SEM micrograph. A scale bar contained in the SEM micrograph is used to find the pixel:nanometer conversion ratio and the conversion rate is applied to the image to give nanometers for any measurement taken. Nanofibers are measured using the straight line tool, which gives the distance of the line in nanometers. The diameter is defined as the minimum distance between one edge of a nanofiber and the other end. Fifty (50) samples are taken, with no nanofiber being measured more than once.

Alignment Test: A test is provided to measure the alignment of nanofibers within a printed trace, where alignment is defined as the angle between an individual nanofiber and the direction of the printed trace, where exact alignment is defined as 0 degrees. The test is performed on a scanning electron microscope micrograph using FIJI. FIJI (FIJI Is Just ImageJ) is an image analysis software and is a version of the image analysis software ImageJ. It is available at https://imagej.net/Fiji/Downloads and has only one version, which is without a number. It is available in both 32-bit and 64-bit versions, but the versions are identical in the relevant functionalities.

For purposes of this specification, a fiber bundle is aligned if:
  a. at least 70% of nanofibers are
    i. Within 25 degrees of the bundle's extruded direction
    ii. Preferably within 10 degrees of the bundle's extruded direction
    iii. Most preferably within 3 degrees of the bundle's extruded direction
  b. Preferably at least 90% of nanofibers are
    i. Within 25 degrees of the bundle's extruded direction
    ii. Preferably within 10 degrees of the bundle's extruded direction
    iii. Most preferably within 3 degrees of the bundle's extruded direction
  c. Most preferably at least 95% of nanofibers are
    i. Within 25 degrees of the bundle's extruded direction
    ii. Preferably within 10 degrees of the bundle's extruded direction
    iii. Most preferably within 3 degrees of the bundle's extruded direction Fiber Length Measurement: The length of fibers is found in the following way: SEM micrographs are stitched together using the image analysis software FIJI. A scale bar contained in the SEM micrograph is used to find the pixel: nanometer conversion ratio and the conversion rate is applied to the image to give nanometers for any measurement taken. Nanofibers are measured using the freehand line tool. The length of the line in nanometers is found by using the "measure" tool within FIJI.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1: All chemicals were used as received without modification or purification. Blends of block copolymer poly(methyl methacrylate)-b-poly(n-butyl acrylate)-b-poly (methyl methacrylate) (1.8 g) was prepared by dissolving in 2.0 g of 1-butanol solvent at 90° C. into a capped 20 mL glass vial. A small stir bar was used to mix the solution for approximately 60 min to dissolve the polymer. After the first polymer was fully dissolved, 1.2 g of polycarbosilane polymer was added in and mixed in at 90° C. for approximately 5 minutes to dissolve. The mixture was allowed cool to 25° C. This results in a gel.

Method for making traces and converting Example 1 into a ceramic: a gel was mixed in a planetary mixer along with 1 g of acetone until the acetone was completely mixed. The liquid was poured into a 3 mL syringe and a 250 µm conical nozzle was attached. The syringe contents were extruded through the nozzle using nitrogen gas pressure from a pressure box. The traces were left in a fume hood for 1 hour for solvent evaporation. The films were thermally cured (to cross-link the polycarbosilane) in a vacuum oven where they were heated at 1° C./min and held at 160° C. and 230° C. for 1 h each. Pyrolysis was carried by raising the film temperature to 800° C. (1 h hold) in flowing argon gas in an alumina tube furnace equipped with a graphite sleeve at a heating rate of 1° C./min.

Example 2: A fiber bundle was produced according to Example 1 except that traces were heated to 160° C. in a vacuum oven at a rate of 1° C./min and held at that temperature for 10 hours.

Example 3: A fiber bundle was produced according to Example 1 except that 1.3 g of 1-butanol was used instead of 2 g.

Example 4: A fiber bundle was produced according to Example 1 except that 3 g of 1-butanol was used instead of 2 g.

Example 5: A fiber bundle was produced according to Example 1 except that 1.5 g of PCP and 1.5 g of BCP are used instead of 1.2 and 1.8 g, respectively.

Example 6: 3D Printing Example. A fiber bundle was produced according to Example 1, except an Aerotech (Aerotech, Pittsburgh, PA) gantry system was used to control the syringe position during extrusion. A pressure box was used to control nitrogen pressure. The gantry system was controlled using the native motion composer and motion controller software provided by Aerotech Inc. Individual traces were extruded through a 250 µm diameter conical nozzle at a height of 200 µm from the substrate. Pressure is applied simultaneously with travel of the syringe on the gantry system.

Example 7: A fiber bundle was produced according to Example 6 except that individual traces were extruded through a 200 µm diameter conical nozzle at a height of 180 µm from the substrate.

Example 8: A fiber bundle was produced according to Example 6 except that individual traces were extruded through a 400 µm diameter conical nozzle at a height of 360 µm from the substrate.

Example 9: A fiber bundle was produced according to Example 1 except that an array of printed traces were strained to 1.5 times their original lengths during curing in a vacuum oven. The fiber alignment and fiber diameter remained the same as in previous examples.

Example 10: A fiber bundle was produced according to Example 1 except that an array of printed traces were strained to 2 times their original lengths during curing in a vacuum oven. The fiber alignment and fiber diameter remained the same as in previous examples.

Testing of Ceramics Made Via the Present Examples: A fiber bundle was tested according to Paragraph 23, by using FIJI image software on an SEM micrograph in the following manner: the image was loaded and the bundle's extruded direction was set to zero. The angle tool was used to determine the number of degrees different individual filaments were from the set zero, examining 75 individual nanofibers. At least 95% of nanofibers were found to be within 3 degrees of the bundle's extruded direction.

Fiber bundles produced according to the present examples are used as polymer matrix composites (PMCs), where a polymer such as an epoxy is backfilled into the spaces between individual nanofibers. Nanofibers provide reinforcing properties to the composite, increasing its strength PMCs according to paragraph 2 are used in body armor, providing the benefits of lower density compared to non-nanofiber materials as well as increased energy absorption per kilogram than alternatives. Filaments are extruded in geometries desired for applications, which provides the desired shapes without the need to bend or flex materials, in contrast with current nanofiber materials.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A process of making bundles of aligned ceramic fibers, said process comprising pyrolyzing a cured extruded filament under an inert gas, said cured extruded filament being produced by extruding a gel to form an extruded filament and then thermally curing said extruded filament to form a cured extruded filament, said gel comprising, based on total gel weight:
    a) from about 11% to about 40%, of a block co-polymer having a weight average molecular weight of from about 53,000 Da to about 77,000 Da, said block co-polymer having Structure 1 below:

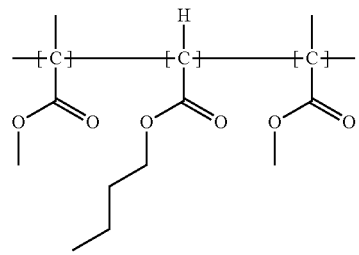

Structure 1 wherein the total weight ratio of

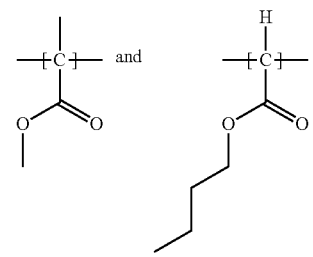

in said block co-polymer is from about 1:3 to about 3:1;
    b) from about 8% to about 34% of a pre-ceramic polymer having a weight average molecular weight of from about 500 Da to about 100,000 Da, said pre-ceramic polymer comprising units having Structure 2 below:

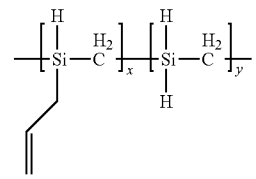

Structure 2 wherein the weight ratio of the moiety having indice x to the moiety having indice y is from about 10:1 to about 1:100;
    c) from about 30% to about 50% of an amphilic solvent, and
    d) from about 13% to about 25% of a plasticizer;
with the proviso that the combined weight percentage of said block co-polymer, pre-ceramic polymer, amphilic solvent and plasticizer does not exceed 100%.

2. The process of claim 1 wherein, based on total gel weight, said gel comprises:
    a) from about 11% to about 40% of said block copolymer;
    b) from about 8% to about 34% of said preceramic polymer;
    c) from about 30% to 50% about of said amphilic solvent; and
    d) from about 13% to about 20% of a plasticizer.

3. The process of claim 2 wherein, based on total gel weight, said gel comprises:
    a) from about 22% to about 37% of said block copolymer;
    b) from about 15% to about 25% of said preceramic polymer;
    c) from about 35% to 46% about of said amphilic solvent; and
    d) from about 14% to about 20% of a plasticizer.

4. The process of claim 3 wherein, based on total gel weight, said gel comprises:
  a) from about 25% to about 35% of said block copolymer;
  b) from about 19% to about 21% of said preceramic polymer;
  c) from about 40% to 45% about of said amphilic solvent; and
  d) from about 16% to about 19% of a plasticizer.

5. The process according to claim 1 wherein said cured extruded filament is produced by extruding a gel at a pressure of from about 500 kPa to about 4000 kPa to form an extruded filament and then thermally curing said extruded filament at a temperature of about 70° C. to about 250° C. to form a cured extruded filament and wherein said cured extruded filament is pyrolyzed at a temperature of about 600° C. to about 900° C.

6. The process according to claim 2 wherein said gel comprises, based on total gel weight:
  a) from about 22% to about 37% of a block co-polymer having a weight average molecular weight of from about 58,000 Da to about 72,000 Da, said block co-polymer having Structure 1 below:

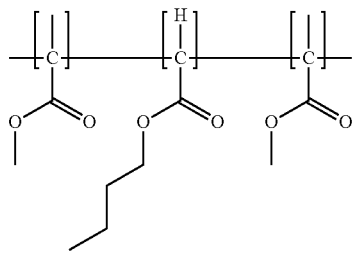

Structure 1 wherein the total weight ratio of

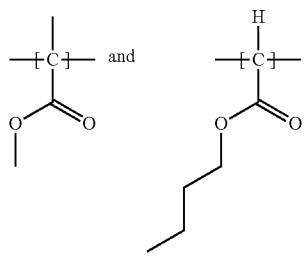 and in said block co-polymer is from about 1:2 to about 2:1;
  b) from about 15% to about 25% of a pre-ceramic polymer having a weight average molecular weight of from about 1,000 Da to about 25,000 Da, said pre-ceramic polymer comprising units having Structure 2 below:

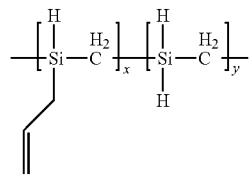

Structure 2 wherein the weight ratio of the moiety having indice x to the moiety having indice y is from about 1:1 to about 1:50;
  c) from about 30% to about 50% of an amphilic solvent that comprises a hydroxyl moiety,
  d) from about 14% to about 20% of a plasticizer;
with the proviso that the combined weight percentage of said block co-polymer, pre-ceramic polymer, amphilic solvent and plasticizer does not exceed 100%.

7. The process according to claim 3 wherein said gel comprises, based on total gel weight:
  a) from about 6% to about 10% of a block co-polymer having a weight average molecular weight of from about 61,000 Da to about 67,000 Da, said block co-polymer having Structure 1 below:

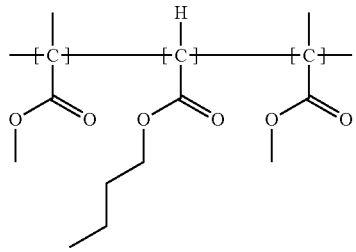

Structure 1 wherein the total weight ratio of

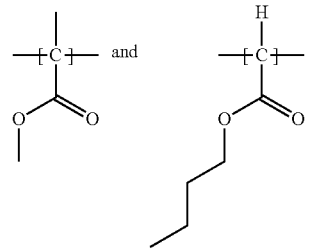 and in said block co-polymer is about 1:1;
  b) from about 25% to about 35% of a pre-ceramic polymer having a weight average molecular weight of from about 2,000 Da to about 15,000 Da, said pre-ceramic polymer comprising units having Structure 2 below:

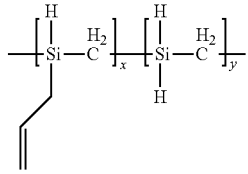

Structure 2 wherein the weight ratio of the moiety having indice x to the moiety having indice y is about 1:10;
  c) from about 35% to about 45%, of an amphilic solvent selected from the group comprising of 2-ethylhexanol, 1-octanol, cyclohexanol and mixtures thereof,
  d) from about 16% to about 19% of a plasticizer;
with the proviso that the combined weight percentage of said block co-polymer, pre-ceramic polymer, amphilic solvent and plasticizer does not exceed 100%.

8. The process according to claim 1 wherein said pre-ceramic polymer is linear or hyper-branched.

9. The process according to claim 1 wherein said pre-ceramic is hyper-branched, said pre-ceramic polymer comprising units having the following formula:

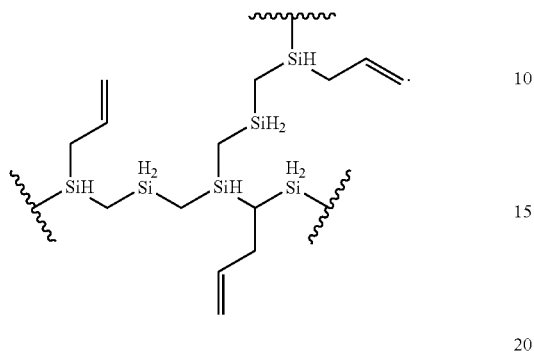

10. The process according to claim 1 wherein said plasticizer comprises acetone.

11. The process according to claim 1 wherein said extrusion process is a 3D printing process.

* * * * *